(12) United States Patent
Jacob et al.

(10) Patent No.: US 11,893,354 B2
(45) Date of Patent: Feb. 6, 2024

(54) SYSTEM AND METHOD FOR IMPROVING CHATBOT TRAINING DATASET

(71) Applicant: Cognizant Technology Solutions India Pvt. Ltd., Chennai (IN)

(72) Inventors: Jithu R Jacob, Kottayam (IN); Siddhartha Das, Bangalore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 378 days.

(21) Appl. No.: 17/347,773

(22) Filed: Jun. 15, 2021

(65) Prior Publication Data
US 2022/0309247 A1   Sep. 29, 2022

(30) Foreign Application Priority Data
Mar. 25, 2021   (IN) .............................. 202141013199

(51) Int. Cl.
*G06F 40/30* (2020.01)
*G06F 40/232* (2020.01)
(Continued)

(52) U.S. Cl.
CPC ............ *G06F 40/30* (2020.01); *G06F 40/117* (2020.01); *G06F 40/232* (2020.01); *G10L 25/30* (2013.01)

(58) Field of Classification Search
None
See application file for complete search history.

(56) References Cited

U.S. PATENT DOCUMENTS 10,617,959 B2   4/2020   Liu
11,087,883 B1*  8/2021   Narayanan ............. G06N 20/00
(Continued)

OTHER PUBLICATIONS

Mikael L. Tedjopranoto, "Correcting Typographical Error and Understanding User Intention in Chatbot by Combining N-Gram and Machine Learning Using Schema Matching Technique", International Journal of Machine Learning and Computing, vol. 9, No. 4, Aug. 2019.
(Continued)

*Primary Examiner* — Pierre Louis Desir
*Assistant Examiner* — Nicole A K Schmieder
(74) *Attorney, Agent, or Firm* — CANTOR COLBURN LLP

(57) ABSTRACT

The present invention provides for improving training dataset by identifying errors in training dataset and generating improvement recommendations. In operation, the present invention provides for identifying and correcting duplicate utterances in training dataset comprising utterances-intent pairs. Further, a plurality of Natural Language ML models are trained with the corrected training dataset to obtain diverse set of trained ML models. Each utterance of training dataset are fed as input to trained ML models, and a probability of error associated with each utterances-intent pairs of training dataset are evaluated based on analysis of respective intent predictions received from each of the trained ML models. Furthermore, spelling errors in the dataset are identified and data-imbalances in the training dataset are evaluated. Finally, a set of improvement recommendations for each utterances-intent pair is generated based on evaluated probability of errors, spelling errors, duplicate utterances and data imbalances.

21 Claims, 6 Drawing Sheets

(51) Int. Cl.
    *G06F 40/117*     (2020.01)
    *G10L 25/30*      (2013.01)

(56) References Cited

U.S. PATENT DOCUMENTS

| | | |
|---|---|---|
| 2014/0289617 A1* | 9/2014 | Rajagopalan ......... G06F 40/166 |
| | | 715/256 |
| 2018/0358001 A1 | 12/2018 | Amid |
| 2019/0103095 A1 | 4/2019 | Singaraju |
| 2019/0244113 A1* | 8/2019 | Ramos ..................... G06N 3/08 |
| 2020/0401914 A1 | 12/2020 | Larson |
| 2021/0082400 A1 | 3/2021 | Vishnoi |

OTHER PUBLICATIONS

Stefan Larson, "An Evaluation Dataset for Intent Classification and Out-of-Scope Prediction", Proceedings of the 2019 Conference on Empirical Methods in Natural Language Processing and the 9th International Joint Conference on Natural Language Processing, pp. 1311-1316, Nov. 3-7, 2019.

Understand what good utterances are foryour LUIS app, Good example utterances—LUIS—Azure Cognitive Services | Microsoft Docs, Internet: URL: https://docs.microsoft.com/en-us/azure/cognitive-services/luis/luis-concept-utterance, May 19, 2020.

* cited by examiner

| UTTERANCE | INTENT |
|---|---|
| UTTERANCE 1<br>.<br>.<br>.<br>UTTERANCE k | INTENT 1 |
| UTTERANCE 1<br>.<br>.<br>.<br>UTTERANCE m | INTENT 2 |
| UTTERANCE 1<br>.<br>.<br>.<br>UTTERANCE n | INTENT 3 |

FIG. 1B

SYSTEM AND METHOD FOR IMPROVING CHATBOT TRAINING DATASET

CROSS REFERENCE TO RELATED APPLICATION

This application is related to and claims the benefit of Indian Patent Application Number 202141013199 filed on Mar. 25, 2021, the contents of which are herein incorporated by reference in their entirety.

FIELD OF THE INVENTION

The present invention relates generally to the field of artificial intelligence. More particularly, the present invention relates to a system and a method for improving dataset prepared for training artificial intelligence based chatbots by identifying errors in the dataset, thereby enhancing performance of chatbots.

BACKGROUND OF THE INVENTION

Chatbots in general are artificial intelligence based tools integrated with customer support platforms of various organizations, and are configured to simulate contextual human conversations with end users. The development of a chatbot primarily includes building up of a Natural Language Understanding (NLU) pipeline for a given dataset, where the NLU pipeline further comprises a Tokenizer configured to segment sentences into tokens, a Vectorizer configured to convert tokens into dense or sparse vectors, and one or more Machine Learning (ML) models configured to receive said vectors as an input. Examples of tokens may include, but are not limited to, words, punctuations etc.

The development of chatbots in today's era of advanced technology can be achieved within minutes using one of the several existing chatbot platforms readily available in the market. The existing chatbot platforms include tools for building an NLU pipeline for a given dataset for further developing trained chatbots. Many of the said existing chatbot platforms apply supervised machine learning algorithms, where labelled training dataset is fed as an input to train one or more chatbot models. The labelled training dataset in case of chatbots is generally in the form of utterances-intent pairs. For instance "when_flight" is an intent for which utterances can be "when is my flight?", "what time my flight starts?" etc. The utterances-intent dataset enables the chatbot to simulate human responses by providing the chatbot models the ability to identify the intent of an incoming user query, and provide an appropriate response. However, it has been observed that the quality of responses generated by any chatbot model trained using supervised machine learning algorithms are only as good as the dataset that is fed in. In view of the same, it is essential that the initial training dataset fed to the chatbot models is error free and easily comprehendible by the chatbot models.

Currently, the preparation of training dataset is a manual and tedious task requiring a developer to consider various utterances-intent pairs based on the complexity of the chatbots. As a consequence, the training dataset is prone to one or more manual errors. In many instances it has been observed that spelling errors occur during preparation of the training dataset, for example, for intent "when_flight" the corresponding utterance may be typed as "when is my fligt?". Similarly, the same utterance "when is my fligt" having incorrect spelling of flight may be duplicated. It has also been observed that supervised machine learning algorithms perform best when all the intents have an equidistributional set of utterances. However, many times a very few (<10) utterances to one intent are provided in an utterances-intent pair of the training dataset, and high number of utterances (>50) may be provided in other utterances-intent pairs of the training dataset, leading to utterance distribution imbalances in the dataset. Further, it has also been observed that as the number of utterances and intents become large, errors such as mapping of utterance to incorrect intent also increases. For instance the utterance "How to reset my password?" may be mapped to the intent "change_password" instead of "reset_password". Furthermore, it has been observed that the training dataset may include closely related intents such as "reset_password" and "change_password", where the utterances linked to the intents may be substantially similar and differentiated only by one or two words. Yet further, the same intent may be combined with different entities, for example, "Book Hotel" and "Book Cab" are similar intents and combined together with different entities "Hotel" and "cab". The existing chatbot platforms do not offer any capability to identify any errors or improve training dataset. Moreover, the machine learning algorithms used by said platforms utilizes the training dataset blindly which leads to incorrect responses, further leading to failure of chatbot implementation.

In light of the above drawbacks, there is a need for a system and a method that can improve the datasets prepared for training artificial intelligence based chatbots. There is need for a system and a method that can identify errors in the chatbot training dataset. Further, there is a need for a system and a method which can identify basic as well as advanced errors in the chatbot training dataset. Furthermore, there is a need for a system and a method which eliminates the need for a user to have any technical expertise to identify chatbot training dataset errors. Yet further, there is a need for a system and a method which can improve the efficiency and performance of the chatbots. Yet further, there is a need for a system and a method which maximizes success rate of the chatbot understanding a user's query and providing an in-scope response. Yet further, there is a need for a system which is inexpensive and can be easily integrated with any existing chatbot platform. Yet further, there is a need for a system which can be readily accessed for identification of errors associated with the chatbot training dataset.

SUMMARY OF THE INVENTION

In various embodiments of the present invention, a method for improving a training dataset comprising one or more utterances-intent pairs is provided. The method is implemented by at least one processor executing program instructions stored in a memory. The method comprises training a plurality of machine learning models with the training dataset to obtain a diverse set of trained Machine Learning (ML) models. The method further comprises feeding each utterance of the one or more utterances-intent pairs as an input to the diverse set of trained ML models to obtain respective intent predictions for each utterance. Further, the method comprises evaluating a probability of error associated with each utterances-intent pair of the training dataset based on an analysis of the respective intent predictions for each utterance. Furthermore, the method comprises generating a set of improvement recommendations associated with each utterances-intent pair of the training dataset based on at least the evaluated probability of error. Yet further, the method comprises removing duplicate utterances and identifying spelling errors associated with utterances and intents of the one or more utterances-intent pairs. Yet further, the method comprises evaluating data-imbalances in the training dataset.

In various embodiments of the present invention, a system for improving a training dataset is provided. The training dataset comprises one or more utterances-intent pairs. The system comprises a memory storing program instructions, a processor configured to execute program instructions stored in the memory, and an error detection engine executed by the processor, and configured to train a plurality of machine learning models with the training dataset to obtain a diverse set of trained Machine Learning (ML) models. Further, the system is configured to feed each utterance of the one or more utterances-intent pairs as an input to the diverse set of trained ML models to obtain respective intent predictions for each utterance. Furthermore, the system is configured to evaluate a probability of error associated with each utterances-intent pair of the training dataset based on an analysis of the respective intent predictions for each utterance. Yet further, the system is configured to generate a set of improvement recommendations associated with each utterances-intent pair of the training dataset based on the evaluated probability of error. Yet further, the system is configured to remove duplicate utterances and identify spelling errors associated with utterances and intents of the one or more utterances-intent pairs, and evaluate data-imbalances in the training dataset.

In various embodiments of the present invention, a computer program product is provided. The computer program product comprises a non-transitory computer-readable medium having computer-readable program code stored thereon, the computer-readable program code comprising instructions that, when executed by a processor, cause the processor to train a plurality of machine learning models with a training dataset to obtain a diverse set of trained Machine Learning (ML) models, where the training dataset comprises one or more utterances-intent pairs. Further, each utterance of the one or more utterances-intent pairs is fed as an input to the diverse set of trained ML models to obtain respective intent predictions for each utterance. Furthermore, a probability of error associated with each utterances-intent pair of the training dataset is evaluated based on an analysis of the respective intent predictions for each utterance. Finally, a set of improvement recommendations associated with each utterances-intent pair of the training dataset is generated based on at least the evaluated probability of error.

BRIEF DESCRIPTION OF THE ACCOMPANYING DRAWINGS

The present invention is described by way of embodiments illustrated in the accompanying drawings wherein:

FIG. 1B is a table illustrating a training dataset comprising utterances-intent pairs, in accordance with an embodiment of the present invention;

DETAILED DESCRIPTION OF THE INVENTION

Figure 1:
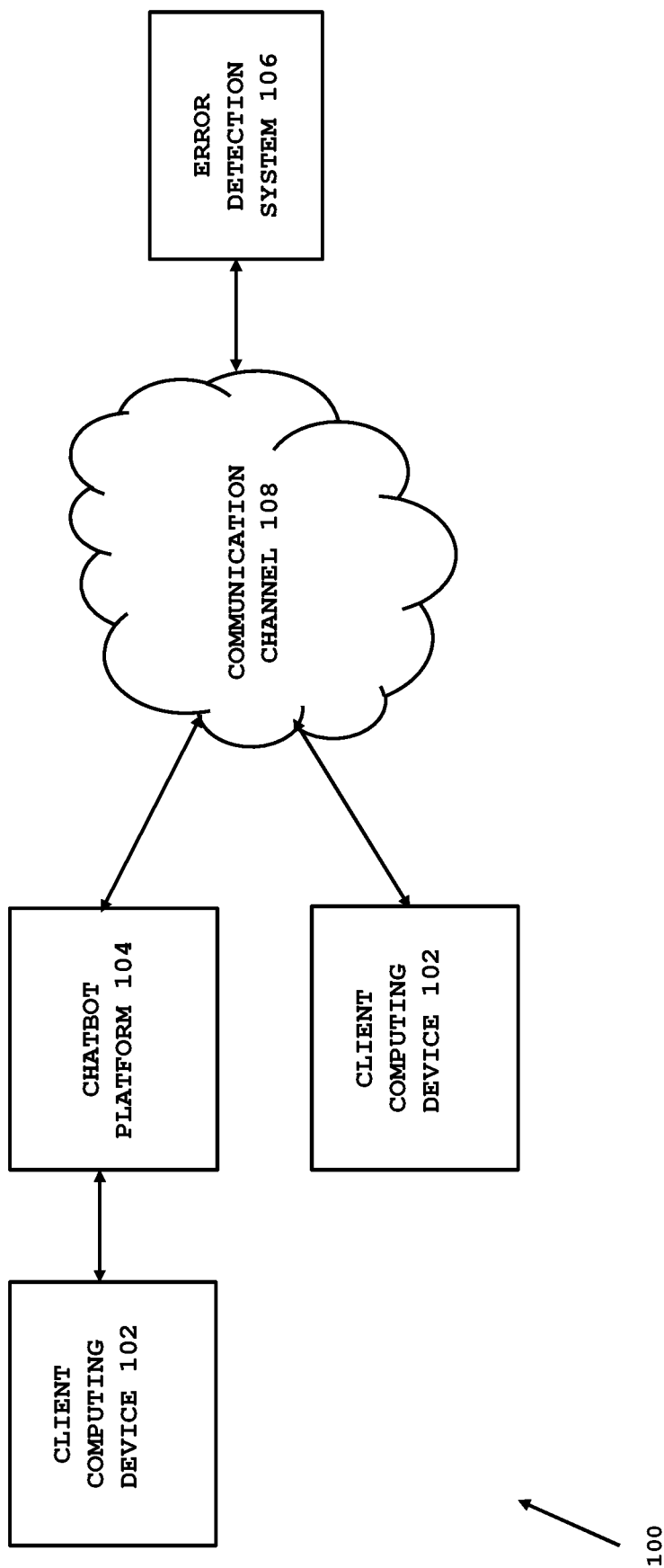
FIG. 1 is a block diagram of a computing environment including a system for improving chatbot training dataset, in accordance with various embodiments of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. It is to be understood that although the present invention is described using a dataset comprising utterances-intent pairs, the present invention can be readily implemented for other training datasets.

The present invention discloses a system and a method for improving chatbot training dataset. In particular, the present invention discloses a system and a method that identifies errors in the training dataset and provides recommendations to improve the training dataset, further enhancing machine learning. In operation, the present invention provides for identifying and correcting duplicate utterances in the training dataset comprising one or more utterances-intent pairs using one or more data analysis techniques. The present invention, further provides for training a plurality of Natural Language Machine Learning (ML) models with the corrected training dataset to obtain a diverse set of trained ML models. The utterances of the corrected training dataset are further fed as an input to the diverse set of trained ML models. Further, a probability of errors associated with each of the one or more utterances-intent pairs are evaluated based on the analysis of respective intent predictions received from each of the diverse set of ML models for each of the one or more utterances in relation to each other and the intent of the corrected training dataset. Further, the present invention provides for identifying spelling errors in the corrected dataset. Furthermore, the present invention provides for evaluating data-imbalances in the corrected training dataset by mapping a difference between a highest count of utterances to intent and a lowest count of utterances to intent in the utterances-intent pairs of the corrected training dataset with a predefined threshold value. Finally, the present invention provides for generating a set of improvement recommendations associated with each of the one or more utterances-intent pairs based on the evaluated probability of errors, spelling errors, duplicate utterances and evaluated data imbalances.

The present invention would now be discussed in context of embodiments as illustrated in the accompanying drawings.

Referring to FIG. 1 a block diagram of a computing environment including a system for improving chatbot training dataset is illustrated. In an embodiment of the present invention the computing environment 100 includes a client computing device 102, a chatbot platform 104 and a system for improving chatbot training dataset, herein after referred to as error detection system 106.

In accordance with various embodiments of the present invention, the client computing device 102 may be a general purpose computer such as a desktop, a laptop, a smartphone and a tablet; a super computer; a microcomputer or any device capable of executing instructions, connecting to a network and sending/receiving data. In an embodiment of the present invention, the client computing device 102 is configured to interface with the error detection system 106 via a communication channel 108 to input training dataset and receive improvement recommendations. Examples of the communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). In an embodiment of the present invention, a user module of the error detection system 106 may be installed onto the client computing device 102 to access the error detection system 106 via the communication channel 106.

In accordance with various embodiments of the present invention, the chatbot platform 104 is any platform which provides tools for building a chatbot using the training dataset. In an embodiment of the present invention, the chatbot platform 104 may be a software tool executable by any computing device. Examples of chatbot platform 104 may include, but are not limited to, DialogFlow, IBM Watson etc. In an embodiment of the present invention, the chatbot platform 104 is configured to interface with the error detection system 106 over the communication channel 108 to export training dataset and receive improvement recommendations.

In accordance with various embodiments of the present invention, the error detection system 106 may be a software executable by a computing device or a combination of software and hardware. In an embodiment of the present invention as shown in FIG. 1, the error detection system 106 is a combination of software and hardware. In an embodiment of the present invention, the error detection system 106 may be implemented as a client-server architecture, wherein the client computing device 102 and/or the chatbot platform 104 accesses a server hosting the error detection system 106 over the communication channel 108. In another embodiment of the present invention, the error detection system 106 may be implemented in a cloud computing architecture in which data, applications, services, and other resources are stored and delivered through shared data-centers. In an exemplary embodiment of the present invention, the functionalities of the error detection system 106 are delivered as Software as a Service (SAAS) to the client computing device 102 and the chatbot platform 104. In an exemplary embodiment of the present invention, the error detection system 106 is a remote resource implemented over the cloud and accessible for shared usage in a distributed computing architecture by various client computing devices 102 and multiple chatbot platforms 106. In an exemplary embodiment of the present invention, the error detection system may be accessed via an IP address/domain name. In another exemplary embodiment of the present invention, the error detection system may be accessed via a user module of the error detection system executable on the client computing device 102 and integrable with the chatbot platform 104. In an embodiment of the present invention, the client computing device 102 is configured with a Graphical User Interface (GUI) of the error detection system 106 to input training dataset and receive improvement recommendations.

In another embodiment of the present invention where the error detection system 106 is integrable with the chatbot platform 104, the client computing device 102 is configured to interface with the chatbot platform 104 over another communication channel (not shown) to access the error detection system 106.

In various embodiments of the present invention, the error detection system 106 is configured to interface with the client computing device 102 and the chatbot platform 104 to receive a training dataset which is to be analyzed and improved, and output improvement recommendations. The error detection system 106 interfaces with the client computing device 102 and/or the chatbot platform 104 over the communication channel 108. As already mentioned, examples of the communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). In an embodiment of the present invention, the error detection system 106 may be a software installable on to the client computing device 102.

Figure 1A:
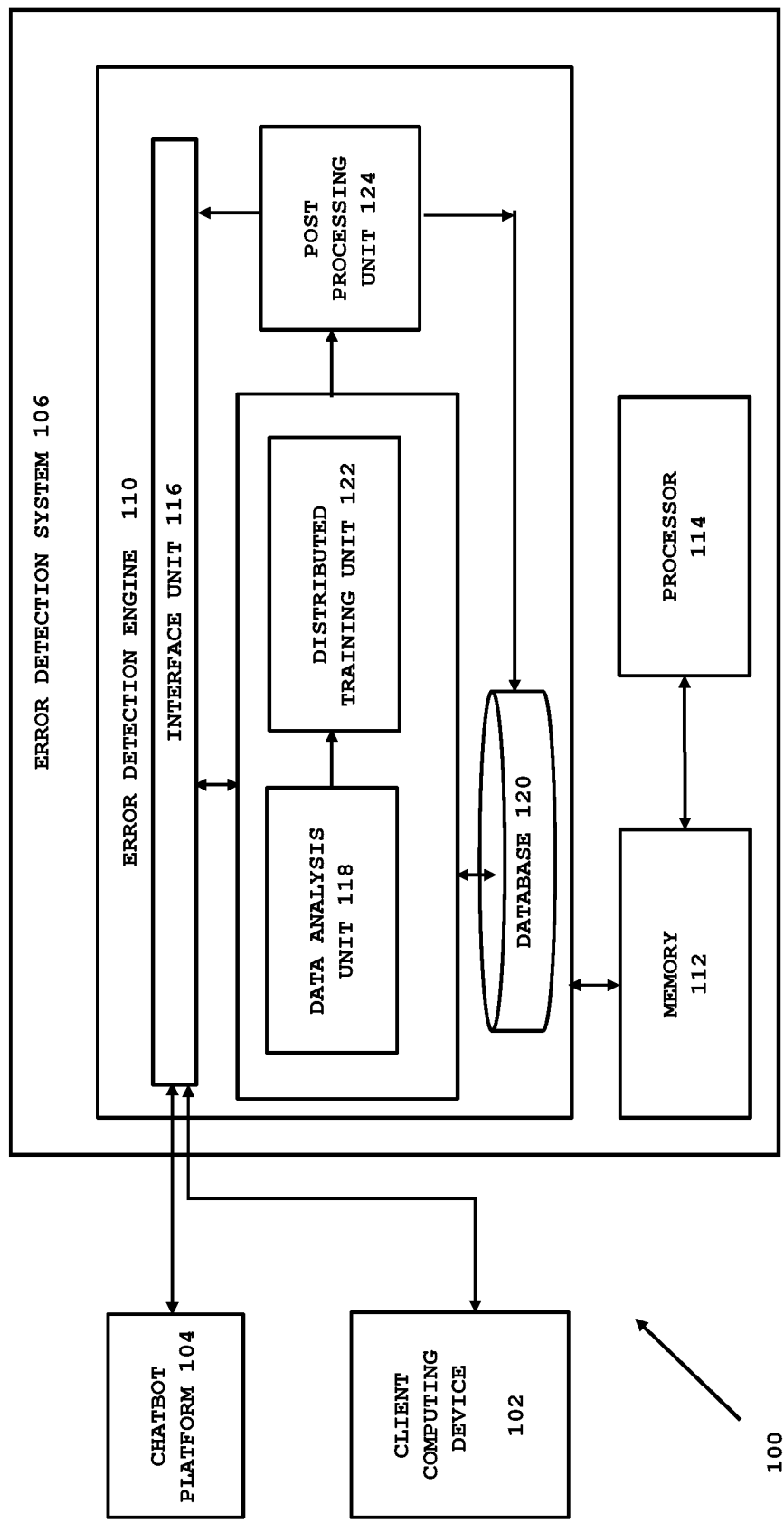
FIG. 1A illustrates a detailed block diagram of a system for improving chatbot training dataset, in accordance with various embodiments of the present invention.

Referring to FIG. 1A a detailed block diagram of a system for improving chatbot training dataset is illustrated, in accordance with various embodiments of the present invention. The error detection system 106 comprises an error detection engine 110, a memory 112, and a processor 114. The error detection engine 106 is operated via the processor 114 specifically programmed to execute instructions stored in the memory 112 for executing functionalities of the error detection engine 106 in accordance with various embodiments of the present invention. In various embodiments of the present invention, the memory 112 may be a Random Access Memory (RAM), a Read-only memory (ROM), hard drive disk (HDD) or any other memory capable of storing data and instructions.

In accordance with various embodiments of the present invention, the error detection engine 110 is a self-contained automated engine configured to receive training dataset, analyze training dataset, identify basic errors in the training dataset, train pre-defined ML models with the training dataset, feed training dataset as an input to the ML models, evaluate error probability and generate improvement recommendations based on the analyzed errors and evaluated error probability.

In accordance with various embodiments of the present invention, the error detection engine 110 comprises an interface unit 116, a data analysis unit 118, a database 120, a distributed training unit 122, and a post processing unit 124. The various units of the error detection engine 110 are operated via the processor 114 specifically programmed to execute instructions stored in the memory 112 for executing respective functionalities of the multiple units (116, 118, 120, 122 and 124) in accordance with various embodiments of the present invention.

In various embodiments of the present invention, the interface unit 116 is configured to facilitate communication with the client computing device 102, the chatbot platform 104 and one or more external system resources (not shown) associated with the error detection system. In an exemplary embodiment of the present invention, the external system resources may include, but are not limited to, admin input/output devices for updating system configurations, third party systems hosting tools such as computing resources, graphics processing tools, tensor processing tools, natural language machine learning models etc. In various embodiments of the present invention, the interface unit 116 is configured to facilitate interfacing with the client computing device 102, the chatbot platform 104, and external system resources (not shown). In an embodiment of the present invention, the interface unit 116 is configured with at least one of: a web gateway, a mobile gateway, an administrator interface and an integration interface to facilitate interfacing with the client computing device 102, the chatbot platform 104, and external system resources (not shown). In an exemplary embodiment of the present invention, the administrator interface provides communication with the admin Input/output devices (not shown) for receiving administration configuration from system admins. Further, the integration interface is configured with one or more APIs such as REST and SOAP APIs to facilitate smooth interfacing and/or integration with the chatbot platform 104.

In an embodiment of the present invention, the interface unit 116 includes a graphical user interface (not shown) accessible on the client computing device 102 to facilitate user interaction. In an exemplary embodiment of the present invention, the graphical user interface allows a user to create login credentials, sign-in using the login credentials, select one or more training datasets, upload training dataset, and receive improvement recommendations associated with the training dataset. In an embodiment of the present invention, the graphical user interface (GUI) associated with the interface unit 116 may be accessed from the client computing device 102 through a web gateway. In another embodiment of the present invention, the interface unit 116 is accessible by the client computing device 102 via a mobile gateway using a user module installable on the client computing device 102. In an exemplary embodiment of the present invention, the user module is capable of integration with chatbot platform 104.

In accordance with various embodiments of the present invention, the interface unit 116 is configured to receive an incoming Chatbot training dataset. In an embodiment of the present invention, the interface unit 116 is configured to receive the incoming training dataset via the client computing device 102. In another embodiment of the present invention, the training dataset uploaded on the chatbot platform 104 may be exported to the interface unit 116. In an embodiment of the present invention, the incoming training dataset may be in CSV/JSON format. In accordance with various embodiments of the present invention, the incoming training dataset comprises one or more utterances-intent pairs, where each intent has one or more associated utterances. An exemplary table of training dataset comprising one or more utterances-intent pairs is shown in FIG. 1B.

In accordance with various embodiments of the present invention, the data analysis unit 118 is configured to receive the incoming training dataset from the interface unit 116. In accordance with various embodiments of the present invention, the data analysis unit 118 is configured to identify and correct duplicate utterances in the incoming training dataset using one or more data analysis techniques. In operation, the data analysis unit 118 is configured to convert each of the utterances associated with respective utterances-intent pairs to lower case. The data analysis unit 118 is further configured to identify duplicate utterances in the lower cased utterances-intent pairs by performing data analysis. Further, the identified duplicate utterances are removed from the incoming training dataset, and stored in the database 120 for further use.

In an embodiment of the present invention, the data analysis unit 118 is configured to identify spelling errors in the utterances and intents of each of the one or more utterances-intent pairs of the incoming training dataset using spell check techniques. In an exemplary embodiment of the present invention, the data analysis unit 118 is integrated with a spell check API to identify spelling errors in the utterances and/or intents of the incoming training dataset and/or the corrected training dataset. Further, the identified spelling errors are stored in the database 120 for further use.

In an embodiment the present invention, the data analysis unit 118 is configured to evaluate data-imbalances in the training dataset. The training dataset may be the initially received training dataset or the corrected training dataset. In an embodiment of the present invention, the data-imbalances in the incoming training dataset are evaluated based on mapping of a difference between a highest count of utterances to intent and a lowest count of utterances to intent in the training dataset comprising more than one utterances-intent pairs with a predefined threshold value. In an exemplary embodiment of the present invention, difference between the highest count and the lowest count is greater than the threshold value (T) is representative of imbalanced dataset. In an exemplary embodiment of the present invention, the threshold value (T) is selected as 5. For example, if the utterance count in the utterances-intent pairs is 10, 12, 14, 20, the data analysis unit 118 performs an imbalance check by subtracting lowest count from the highest count, and mapping with the threshold value T, i.e. (20−10)>T (5) which implies data imbalance.

In another embodiment of the present invention, the data analysis unit 118 is configured to evaluate data-imbalances in each of the utterances-intent pairs of the training dataset by mapping the count of utterances to intent in each of the said one or more utterances-intent pairs with a predefined utterance count (U). In an exemplary embodiment of the present invention, the utterance count (U) is selected as 10 based on a consideration that the training dataset with a minimum of 10 utterances associated with an intent in each of the utterances-intent pairs has a uniform distribution. Further, a tolerance limit may be added to the utterance count. In an exemplary embodiment of the present invention, the tolerance limit (t) is selected as 5. In an exemplary embodiment of the present invention, each utterances to intent count greater than the utterance count (U) combined with the tolerance limit (t) is representative of imbalanced utterances-intent pair. For example, if the utterance to intent count in the utterances-intent pairs is 10, 12, 14, 20, said count is mapped with the utterance count (U) combined with the tolerance limit (t) to evaluate data-imbalance i.e. 20<10 (U)+5(t) indicating data imbalance in the utterance-intent count 20. Further, the data analysis unit 118 is configured to store the evaluated data imbalances in the database 120.

In accordance with various embodiments of the present invention, the distributed training unit 122 is configured to receive the corrected training dataset and the initially received training dataset from the data analysis unit 118. In accordance with various embodiments of the present invention, the distributed training unit 122 is configured to train a plurality of predefined Natural Language Machine Learning (ML) models. In an embodiment of the present invention, the distributed training unit 122 is configured to train a plurality of predefined Natural Language Machine Learning (ML) models with the corrected training dataset. In another embodiment of the present invention, the distributed training unit 122 is configured to train a plurality of predefined Natural Language Machine Learning (ML) models with the initially received training dataset. In an embodiment of the present invention, the Natural Language ML models are generated and hosted by the distributed training unit 122 using a combination of simple and advanced Natural Language Processing (NLP) techniques. In another embodiment of the present invention, the Natural Language ML models are generated and hosted by the distributed training unit 122 via the external system resources (not shown) using a combination of simple and advanced Natural Language Processing (NLP) techniques. In an embodiment of the present invention, the distributed training model is configured to obtain a diverse set of trained ML models by training each of the predefined natural language ML models using one or more supervised machine learning techniques and varying the values of tunable parameters, and options associated with said one or more supervised machine learning techniques. Examples of machine learning techniques may include, but are not limited to, Bidirectional Encoder Representations from Transformers (BERT), Universal Language Model Fine-Tuning (ULMFIT), ELMo, bag of words etc. Examples of varying the tunable parameters may include, but are not limited to, use of stop word removal, stemming or lemmatization, TFIDF or Count Vectorization, N-grams etc. alone or in combination as preprocessing techniques in the bag of words machine learning technique. Other examples of tunable parameters may include, but are not limited to, batch size, learning rate, epochs, regularization rate, etc.

In an embodiment of the present invention, the distributed training unit 122 is configured to implement one or more machine learning techniques as distributed worker-units (not shown) to train each of the plurality of natural language ML models in parallel with the corrected training dataset. In an exemplary embodiment of the present invention, (k) worker-units may be implemented by varying the tunable parameters of the one or more machine learning techniques to train (k) ML models, where (k) is a variable denoting the count or number of worker-units and ML models. In operation, the distributed training unit 122 assigns a worker-unit to train a natural language ML model. Each worker-unit is configured to fit the corresponding language model with the corrected training dataset. In an exemplary embodiment of the present invention, the worker-unit is configured to train the ML models using external system resources such as graphics processing units (GPUs) and tensor processing units (TPUs) depending on the type of language model. Further, the worker-units are configured to use K-fold cross-validation and regularization techniques to prevent overfitting during training to obtain a diverse set of trained ML models. In an embodiment of the present invention, any new machine learning technique may be implemented as a worker-unit any time, thereby providing elasticity to the distributed training unit 122. In accordance with various embodiments of the present invention, the distributed training unit 122 may be implemented using any queuing system such as, but not limited to, RabbitMQ, AWS SQS etc.

In an embodiment of the present invention, the distributed training unit 122 is further configured to feed each utterance of the corrected training dataset as an input to each of the diverse set of trained ML models. In another embodiment of the present invention, the distributed training unit 122 is configured to feed the utterances of initially received training dataset as an input to each of the diverse set of trained ML models, where the diverse set of trained ML models are trained with initially received training dataset. The distributed training unit 122 is further configured to store in the database 120 the intent predictions and prediction scores received from each of the diverse set of ML models in response to each of the utterances associated with the utterance-intent pairs of the fed training dataset. The prediction score is representative of confidence of the ML model while making the intent prediction.

In accordance with various embodiments of the present invention, the post processing unit 124 is configured to receive the intent predictions and prediction scores for each utterance in the fed training dataset from the distributed training unit 122. The post processing unit 124 is configured to evaluate a probability of error associated with each of the one or more utterances-intent pairs of the training dataset based on the analysis of respective intent predictions by each of the diverse set of ML models for each of the one or more utterances in relation to each other and the intent of the training dataset. Each of the ML model from the diverse set of ML models has learned different patterns in the fed dataset. Therefore, an analysis of intent predictions from the diverse set of ML models provides a basic knowledge regarding the learning of each of the diverse set of ML models, in particular the analysis provides knowledge as to which intent the utterance will be placed if a user enters the exact utterance query as the fed training data. In operation, in an embodiment of the present invention, the post processing unit 124 evaluates the probability of errors associated with each of the one or more utterances-intent pairs of the training dataset by computing a similarity score (S) associated with intent prediction for each utterance in the training dataset. The similarity score (S) is representative of number/percentage of ML models out of the diverse set of ML models providing similar intent prediction for the same utterance. Further, the intent prediction for an utterance is mapped with the intent associated with the same utterance in the training dataset. Further, the probability of error associated with each utterances-intent pair is evaluated based on the similarity score (S) and the mapping. In an embodiment of the present invention, in case of a mismatch during mapping, a similarity score (S) greater than or equal to a similarity-threshold (ST) is indicative of high probability error such as "Incorrect utterance-intent mapping" or "closely-related intents". Further, in case of a mismatch during mapping, a similarity score (S) less than or equal to a similarity-threshold (ST) is also indicative of high probability of error. Furthermore, in case of a match during mapping, a similarity score (S) less than or equal to a similarity-threshold (ST) is indicative of high probability of errors such as "closely-related intents". Furthermore, in case of a match during mapping, a similarity score (S) greater than or equal to a similarity-threshold (ST) is indicative of low probability of error.

In an embodiment of the present invention, the post processing unit 124 is further configured to perform error identification to determine "incorrect tagging of utterance to an intent" and "closely related intents error" based on the similarly score for each utterance, Similarity Threshold (ST) and a Sensitivity Value (SV). For example, in case of k natural language ML models, if k=500 and there are overall 400 utterances associated with the intents X1, X2, X3, X4 to X10, then 500 ML models are trained with 400 utterances, where each utterance is associated with one of the intents X1, X2, X3, X4 to X10. In an exemplary embodiment of the present invention, the predictions of all (k) ML models for each utterance are analyzed. In the example, utterance 36 is associated with intent X4 in the fed training dataset. However, almost each of the 500 ML models are classifying utterance 36 as intent X3 giving a high similarity score. Considering the probability of overfitting to be low, such an occurrence of mismatch and high similarly score is indicative of error such as an incorrect tagging of utterance to an intent. Further, there is a possibility that intents X3 and X4 are closely related, and probably utterance 36 is better suited in intent X3 than X4. The post processing unit 124 decides between "incorrect tagging of utterance to an intent" and "closely related intents error" based on the Similarity Threshold (ST) and the Sensitivity Value (SV). For instance, in the above example of mismatch in mapping and a high similarity score, if the Similarity Threshold (ST) is set to 90%, indicating either "incorrect tagging of utterance to an intent error" or "closely related intents error", a Sensitivity Value (SV) may be set as 95%, whereby a Similarity score (S)>=90% but<=(SV)95% is indicative of closely related intents, and a similarity score (S)>=90% and >=(SV)95% is indicative of "incorrect tagging of utterance to an intent".

In accordance with various embodiments of the present invention, the post processing unit 124 is configured to retrieve spelling errors and duplicate utterances associated with each of the utterances-intent pairs, and data-imbalances associated with the corrected dataset from the database 120. The post processing unit 124 is configured to generate a set of improvement recommendations associated with each of the one or more utterances-intent pairs based on the evaluated probability of errors, spelling errors, duplicate utterances and evaluated data imbalances. The set of improvement recommendations comprises at least the type of error, number of errors, probability of errors, and suggestions to remove the errors. The type of errors may include, but are not limited to, spelling errors, duplicate utterances, data imbalance, incorrect utterance to intent mapping, and closely related intents. In an embodiment of the present invention, the post processing unit 124 is configured to transmit the improvement recommendations to the client computing device 102 and/or the chatbot platform 104 to make the requisite changes in the training dataset.

Advantageously, the system of the present invention, readily improves machine learning and chatbot implementations by identifying errors and providing improvement recommendation to eliminate the identified errors. Further, the system of the present invention, automatically eliminates basic errors such as duplicate utterances. Furthermore, the system of the present invention provides ready accessibility to dataset improvement via any client computing device.

Figure 2:
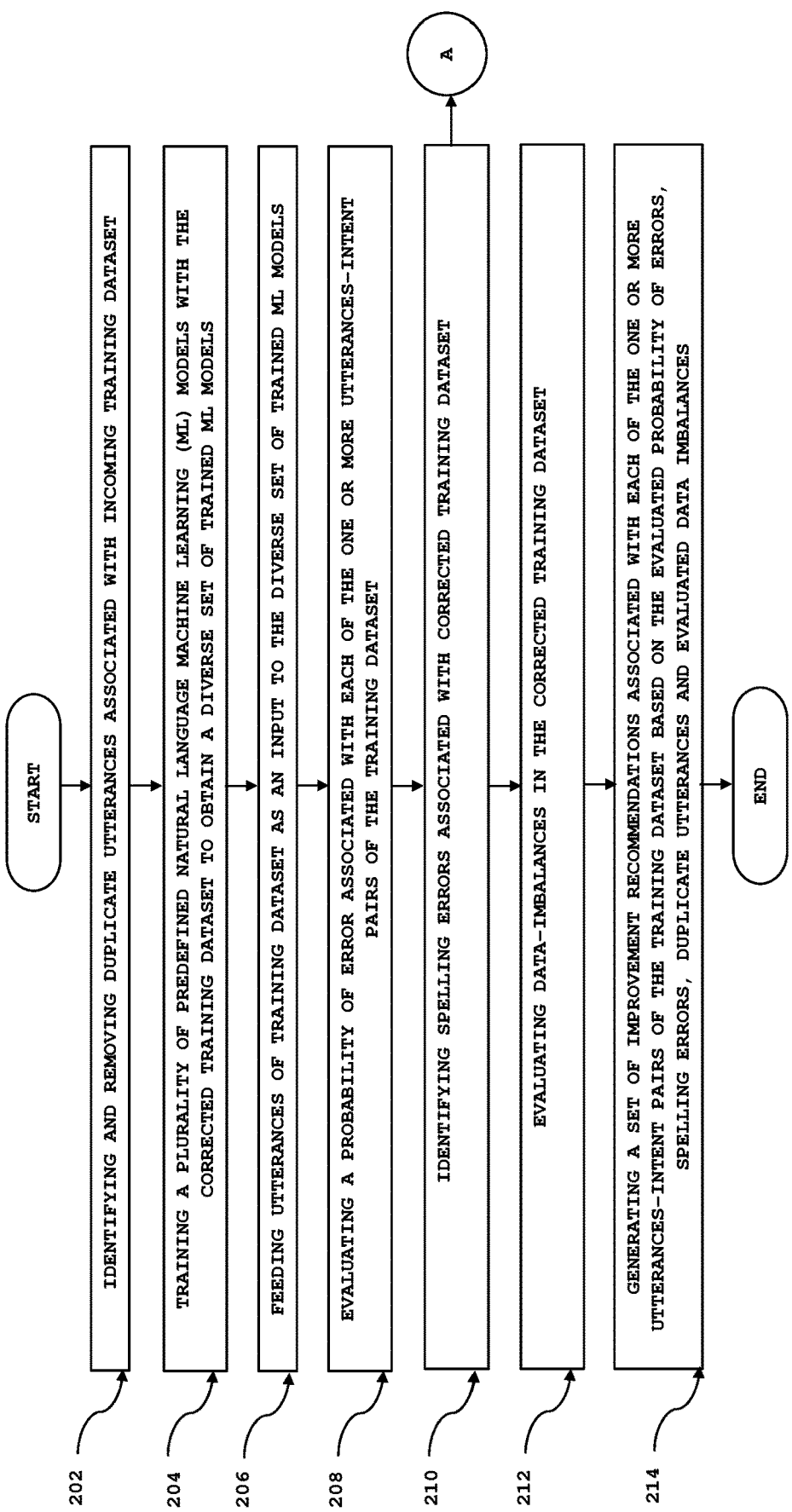
FIG. 2 is a flowchart illustrating a method for improving chatbot training dataset, in accordance with various embodiments of the present invention.

Referring to FIG. 2 a flowchart illustrating a method for improving chatbot training dataset is shown in accordance with various embodiments of the present invention.

At step 202, duplicate utterances associated with incoming training dataset are identified and removed to obtain a corrected training dataset. In accordance with various embodiments of the present, the duplicate utterances in the incoming training dataset are identified and removed using one or more data analysis techniques. In operation, the incoming training dataset is received from a client computing device or a chatbot platform. The incoming training dataset may be in CSV/JSON format. As shown in FIG. 1B, the incoming training dataset comprises one or more utterances-intent pairs, where each intent has one or more associated utterances. Each of the utterances associated with respective utterances-intent pairs of the incoming training dataset are converted to lower case. Further, duplicate utterances in the lower cased utterances-intent pairs are identified using one or more data analysis techniques. The identified duplicate utterances are removed from the training dataset, and stored in a database for further use.

At step 204, a plurality of predefined Natural Language processing Machine Learning (ML) models are trained with the corrected training dataset to obtain a diverse set of trained ML models. In an embodiment of the present invention, a diverse set of trained ML models is obtained by training each of the predefined natural language ML models using one or more supervised machine learning techniques and varying the values of tunable parameters (also referred to as hyper parameters) and options associated with said one or more supervised machine learning techniques. Examples of machine learning techniques may include, but are not limited to, Bidirectional Encoder Representations from Transformers (BERT), Universal Language Model Fine-Tuning (ULMFIT), ELMo, bag of words etc. Some examples of varying the tunable parameters may include, but are not limited to, use of stop word removal, stemming or lemmatization, TFIDF or Count Vectorization, N-grams etc. alone or in combination as preprocessing techniques in the bag of words machine learning technique. Other examples of tunable parameters may include, but are not limited to, batch size, learning rate, epochs, regularization rate, etc.

In an embodiment of the present invention, the one or more machine learning techniques are implemented as distributed worker-units to train each of the plurality of natural language ML models in parallel with the corrected training dataset. In an exemplary embodiment of the present invention (k) worker-units may be implemented by varying the tunable parameters of the one or more machine learning techniques to train (k) natural language ML models, where (k) is a variable denoting the count or number of worker-units and natural language ML models. In operation, each of the natural language ML models is fit with the corrected training dataset by the corresponding assigned worker-unit. In an exemplary embodiment of the present invention, the worker-unit is configured to train the natural language ML models using external system resources depending on the type of language model. Further, the worker-units are configured to use K-fold cross-validation and regularization techniques to prevent overfitting during training to obtain a diverse set of ML models. In an embodiment of the present invention, any new machine learning technique may be implemented as a worker-unit.

At step 206, the corrected training dataset is fed as an input to the diverse set of trained ML models. In accordance with various embodiments of the present invention, each utterance of the corrected training dataset is fed as an input to each of the diverse set of trained ML models, and respective intent predictions and prediction scores received from each of the diverse set of ML models in response to each of the utterances in the utterance-intent pairs of the fed training dataset are stored in a database. In various embodiments of the present invention, the prediction score is representative of confidence of the ML model while making the intent prediction.

Figure 2A:
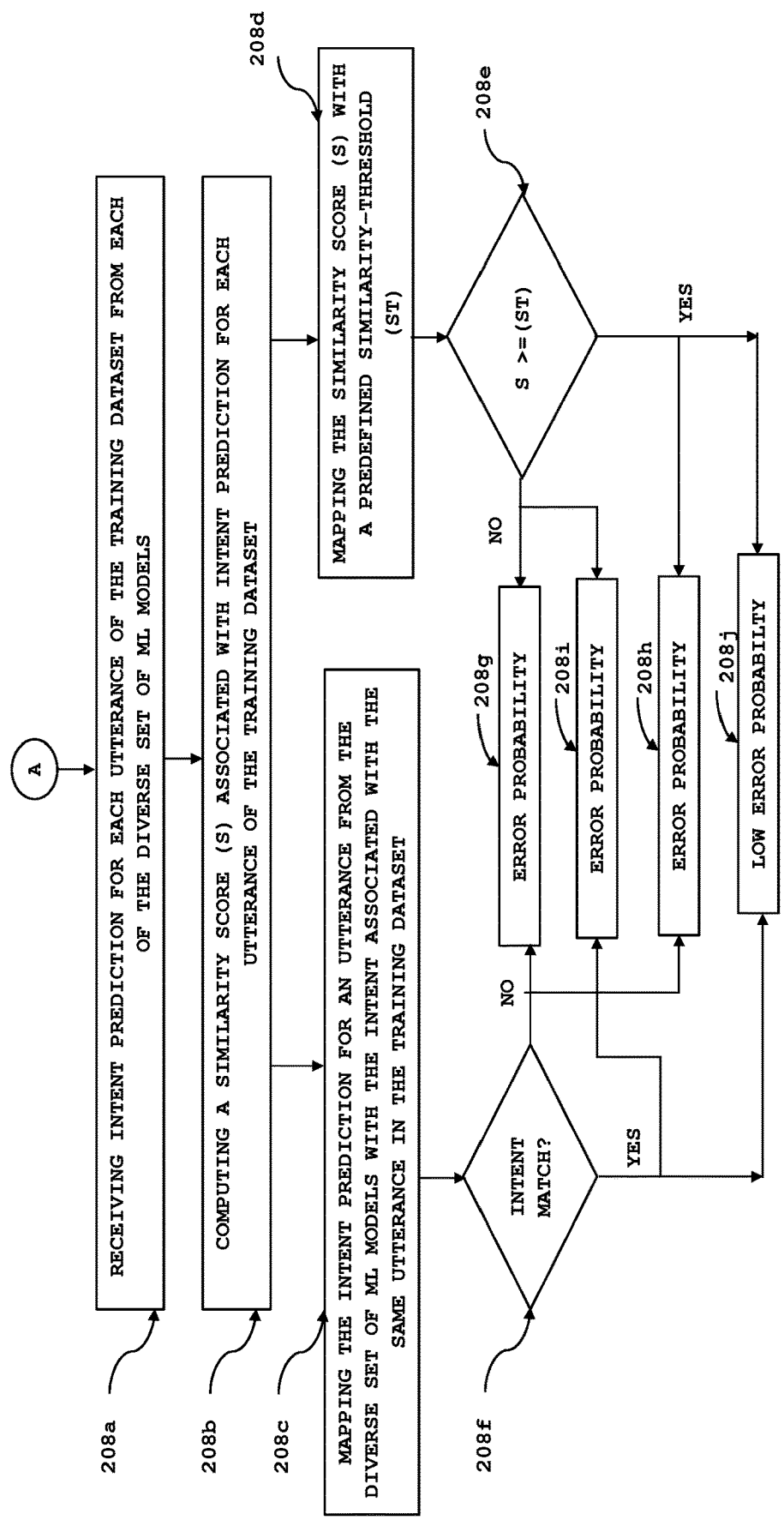
FIG. 2A is a flowchart illustrating a method for evaluating error probability associated with training dataset, in accordance with various embodiments of the present invention.

At step 208, a probability of error associated with each of the one or more utterances-intent pairs of the fed training dataset is evaluated. In an embodiment of the present invention, a probability of error associated with each of the one or more utterances-intent pairs of the corrected training dataset is evaluated based on the analysis of respective intent predictions received from each of the diverse set of ML models for each of the one or more utterances in relation to each other and the intent of the fed training dataset. The analysis of intent predictions by the diverse set of ML models provides a basic knowledge regarding the learning of each of the diverse set of ML models, in particular the analysis provides knowledge as to which intent the utterance will be placed if a user enters the exact utterance query as the fed training data. In operation, in an embodiment of the present invention, the evaluation of probability of errors associated with each of the one or more utterances-intent pairs of the fed training dataset comprises the following steps as shown in FIG. 2A.

At step 208a, intent prediction and prediction score for each utterance of the fed training dataset is received from each of the diverse set of trained ML models. At step 208b, a similarity score (S) associated with intent prediction for each utterance of the training dataset is computed. The similarity score (S) is representative of number/percentage of ML models out of the diverse set of ML models providing similar intent prediction for the same utterance. At step 208c, the intent prediction for an utterance from each of the diverse set of ML models is mapped with the intent associated with the same utterance in the training dataset.

In accordance with various embodiments of the present invention, the probability of error associated with each utterances-intent pair of the training dataset is evaluated based on the similarity score (S) and the mapping as follows: At step 208d the similarity score (S) associated with intent prediction for each utterance of the training dataset is mapped with a predefined similarity-threshold (ST). At step 208e a check is performed to determine if the similarity score (S) associated with the intent prediction greater than or equal to a similarity-threshold (ST). Simultaneously, at step 208f a check is performed to determine if the intent prediction for the utterance from the diverse set of ML models matches with the intent associated with the same utterance in the training dataset. In case of a mismatch during mapping, a similarity score (S) less than or equal to a similarity-threshold (ST) is indicative of high probability of error (step 208g). Further, in case of a mismatch during mapping, a similarity score (S) greater than or equal to a similarity-threshold (ST) is indicative of high probability of error such as "Incorrect utterance-intent mapping" or "closely-related intents" (step 208h). Furthermore, in case of a match during mapping, a similarity score (S) less than or equal to a similarity-threshold (ST) is indicative of high probability of error such as "closely-related intents" (step 208i). Furthermore, in case of a match during mapping, a similarity score (S) greater than or equal to a similarity-threshold (ST) is indicative of low probability of error (step 208j).

In an embodiment of the present invention, an error identification between "incorrect tagging of utterance to an intent" and "closely related intents error" is performed based on the similarity score for each utterance, the Similarity Threshold (ST) and a Sensitivity Value (SV). For example, in case of k natural language ML models, if k=500 and there are overall 400 utterances associated with the intents X1, X2, X3, X4 to X10, then 500 ML models are trained with 400 utterances, where each utterance is associated with one of the intents X1, X2, X3, X4 to X10. In an exemplary embodiment of the present invention, the predictions of all (k) ML models for each utterance are analyzed. In the example, utterance 36 is associated with intent X4 in the fed training dataset. However, almost each of the 500 ML models may classify utterance 36 as intent X3 implying a high similarity score. Considering the probability of overfitting to be low, such an occurrence of mismatch and high similarly score is indicative of error such as an incorrect tagging of utterance to an intent. Further, there is a possibility that intents X3 and X4 are closely related, and probably utterance 36 is better suited in intent X3 than X4. The decision between "incorrect tagging of utterance to an intent" and "closely related intents error" is made based on the Similarity Threshold (ST) and the Sensitivity Value (SV). For instance, in the above example of mismatch in mapping and a high similarity score, if the Similarity Threshold (ST) is set to 90%, indicating either "incorrect tagging of utterance to an intent error" or "closely related intents error", a Sensitivity Value (SV) may be set as 95%, whereby a Similarity score (S)>=90% but<=(SV)95% is indicative of closely related intents, and a similarity score (S)>=90% and >=(SV)95% is indicative of "incorrect tagging of utterance to an intent".

At step 210, spelling errors associated with the training dataset are identified. In an embodiment of the present invention, the spelling errors in the corrected training dataset are identified. In an embodiment of the present invention, the spelling errors in the utterances and intents of each of the one or more utterances-intent pairs of the training dataset are identified using spell check technique. In an exemplary embodiment of the present invention, the spelling errors are identified using spell check APIs. Further, the identified spelling errors are stored in the database for further use.

At step 212, data-imbalances in the corrected training dataset are evaluated. In an embodiment of the present invention, the data-imbalances in the training dataset are evaluated based on mapping of a difference between a highest count of utterances to intent and a lowest count of utterances to intent in the training dataset with a predefined threshold value (T), where the training dataset comprises more than one utterances-intent pairs. In an exemplary embodiment of the present invention, the difference between highest count and lowest count greater than the threshold value is representative of imbalanced dataset. In an exemplary embodiment of the present invention, the threshold value (T) is selected as 5. For example, if the utterance count in the utterances-intent pair is 10, 12, 14, 20, an imbalance check is performed by subtracting lowest count from the highest count, and mapping with the threshold value T, i.e. (20−10)>T (5) which implies data imbalance.

In another embodiment of the present invention, the data-imbalances in each of the utterances-intent pairs of the training dataset is evaluated by mapping the count of utterances to intent in each of the said one or more utterances-intent pairs with a predefined utterance count (U). In an exemplary embodiment of the present invention, the utterance count (U) is selected as 10 based on a consideration that the training dataset with a minimum of 10 utterances associated with an intent in each of the utterances-intent pairs has a uniform distribution. Further, a tolerance limit may be added to the utterance count. In an exemplary embodiment of the present invention, the tolerance limit (t) is selected as 5. In an exemplary embodiment of the present invention, each utterances to intent count greater than the utterance count (U) combined with the tolerance limit (t) is representative of imbalanced utterances-intent pair. For example, if the utterance to intent count in the utterances-intent pairs is 10, 12, 14, 20, said count is mapped with the utterance count (U) combined with the tolerance limit (t) to evaluate data-imbalance i.e. 20<10(U)+5(t) indicating data imbalance in the utterance-intent count 20. Further, the evaluated data imbalances are stored in the database.

At step 214, a set of improvement recommendations associated with each of the one or more utterances-intent pairs of the incoming training dataset is generated based on the evaluated probability of errors, spelling errors, duplicate utterances and evaluated data imbalances. In operation, the spelling errors, duplicate utterances, data-imbalances and evaluated probability of errors associated with each of the utterances-intent pairs of the incoming training dataset are retrieved from the database and aggregated in a predefined format. Further, a set of improvement recommendations associated with each of the one or more utterances-intent pairs are generated based on the evaluated probability of errors, spelling errors, duplicate utterances and evaluated data imbalances. In an embodiment of the present invention, the set of improvement recommendations comprises at least the type of error, number of errors, probability of errors, and suggestions to remove the errors. The type of errors may include, but are not limited to, spelling errors, duplicate utterances, data imbalance, incorrect utterance to intent mapping, and closely related intents. In an embodiment of the present invention, the improvement recommendations are transmitted to the client computing device and/or the chatbot platform.

Figure 3:
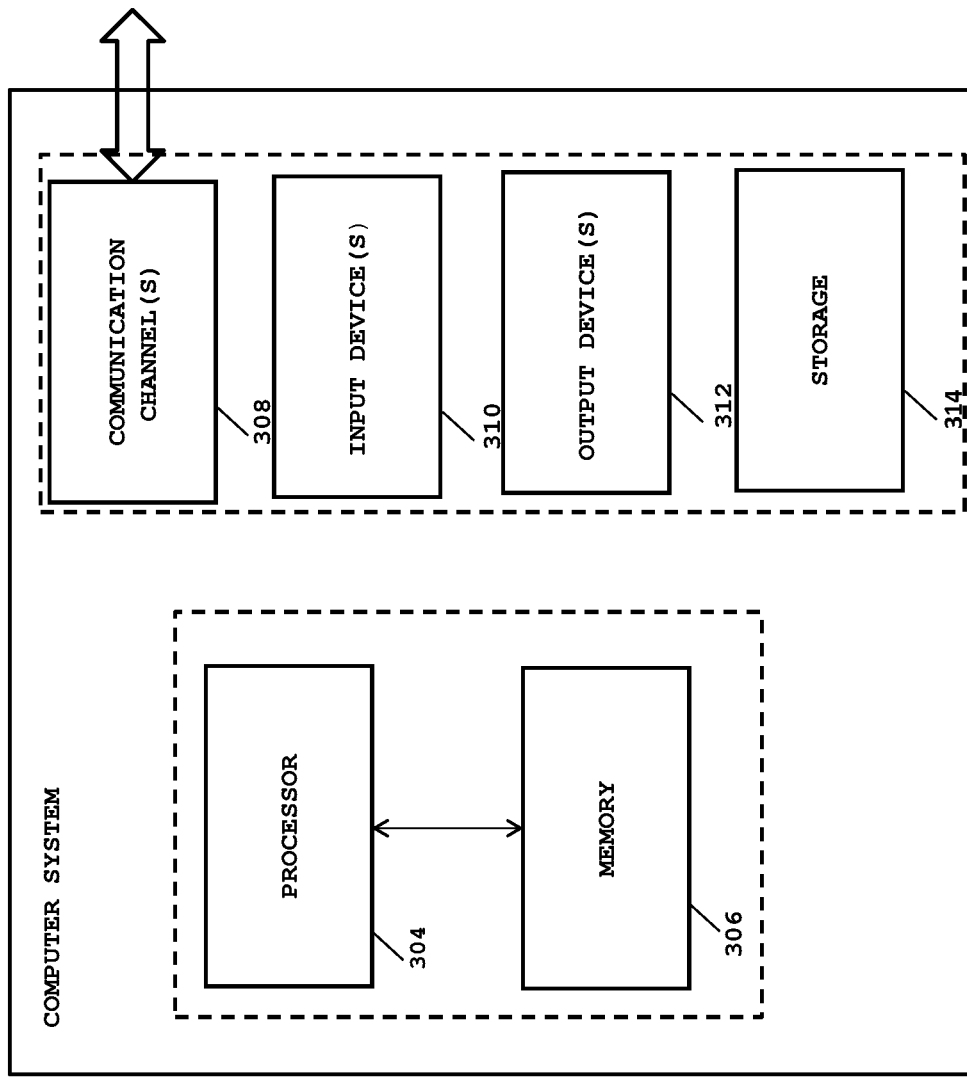
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for improving a training dataset comprising one or more utterances-intent pairs, wherein the method is implemented by at least one processor executing program instructions stored in a memory, the method comprising:
    training, by the at least one processor, a plurality of machine learning models with the training dataset to obtain a diverse set of trained Machine Learning (ML) models;
    feeding, by the at least one processor, each utterance of the one or more utterances-intent pairs as an input to the diverse set of trained ML models to obtain respective intent predictions for each utterance;
    evaluating, by the at least one processor, a probability of error associated with each utterances-intent pair of the training dataset based on an analysis of the respective intent predictions for each utterance, wherein:
        a mismatch during mapping of the intent prediction for each utterance from each of the diverse set of ML models with the intent associated with the utterance in the training dataset and a similarity score associated with the intent predictions for each utterance less than or equal to a predefined similarity-threshold (ST) is indicative of a high probability of error, the similarity score (S) is representative of a percentage of ML models out of the diverse set of ML models providing similar intent predictions for same utterance, a mismatch during the mapping and the similarity score (S) greater than or equal to the predefined similarity-threshold (ST) is indicative of a high probability of error, a match during the mapping and the similarity score (S) less than or equal to the predefined similarity-threshold (ST) is indicative of a high probability of error, and a match during the mapping and the similarity score (S) greater than or equal to the predefined similarity-threshold (ST) is indicative of a low probability of error; and generating, by the at least one processor, a set of improvement recommendations associated with each utterances-intent pair of the training dataset based on the evaluated probability of error.

2. The method as claimed in claim 1, wherein duplicate utterances associated with each of the one or more utterances-intent pairs of the training dataset are identified and removed to obtain a corrected training dataset, and the plurality of Machine Learning models are trained with the corrected training dataset.

3. The method as claimed in claim 1, wherein the plurality of machine learning models are natural language processing machine learning models, wherein further the plurality of machine learning models are trained with the training dataset using one or more machine learning techniques, and varying tunable parameters associated with the one or more machine learning techniques.

4. The method as claimed in claim 1, wherein the analysis of the respective intent predictions for each utterance received from the diverse set of trained ML models is performed in relation to each other and the intent associated with said utterance in the training dataset.

5. The method as claimed in claim 1, wherein evaluating the probability of error associated with each utterances-intent pair of the training dataset based on the analysis of the respective intent predictions, comprises:

receiving the respective intent predictions for each utterance of the utterances-intent pair from each of the diverse set of trained ML models;

computing the similarity score (S) and performing the mapping; and evaluating the probability of error associated with each utterances-intent pair of the training dataset based on the similarity score (S) and the mapping.

6. The method as claimed in claim 1, wherein a type of error including incorrect tagging of utterance to an intent error and closely related intents error is identified based on the similarity score.

7. The method as claimed in claim 2, wherein spelling errors associated with utterances and intents of the one or more utterances-intent pairs are identified.

8. The method as claimed in claim 7, wherein data-imbalances in the corrected training dataset are evaluated based on mapping of a difference between a highest count of utterances to intent and a lowest count of utterances to intent in the corrected training dataset with a predefined threshold value (T), wherein the corrected training dataset comprises more than one utterances-intent pairs.

9. The method as claimed in claim 8, wherein the set of improvement recommendations associated with each utterances-intent pair of the training dataset is generated based on the evaluated probability of error, identified duplicate utterances, identified spelling errors and the data imbalances.

10. The method as claimed in claim 9, wherein the set of improvement recommendations comprises at least type of error, number of errors, probability of errors, and suggestions to remove the errors, wherein the type of errors includes spelling errors, duplicate utterances, data imbalances, incorrect utterance to intent mapping, and closely related intents.

11. A system for improving a training dataset, said training dataset comprising one or more utterances-intent pairs, the system comprising:

a memory storing program instructions; at least one processor configured to execute program instructions stored in the memory; and an error detection engine executed by the at least one processor, and configured to:

train a plurality of machine learning models with the training dataset to obtain a diverse set of trained Machine Learning (ML) models;

feed each utterance of the one or more utterances-intent pairs as an input to the diverse set of trained ML models to obtain respective intent predictions for each utterance;

evaluate a probability of error associated with each utterances-intent pair of the training dataset based on an analysis of the respective intent predictions for each utterance, wherein a mismatch during mapping the intent prediction for each utterance from each of the diverse set of ML models with the intent associated with the utterance in the training dataset and a similarity score (S) associated with the intent predictions for each utterance less than or equal to a predefined similarity-threshold (ST) is indicative of a high probability of error, the similarity score (S) is representative of percentage of ML models out of the diverse set of ML models providing similar intent predictions for same utterance, a mismatch during the mapping and the similarity score (S) greater than or equal to the predefined similarity-threshold (ST) is indicative of a high probability of error, a match during the mapping and the similarity score (S) less than or equal to the predefined similarity-threshold (ST) is indicative of a high probability of error, and a match during the mapping and the similarity score (S) greater than or equal to the predefined similarity-threshold (ST) is indicative of a low probability of error; and generate a set of improvement recommendations associated with each utterances-intent pair of the training dataset based on the evaluated probability of error.

12. The system as claimed in claim 11, wherein the error detection engine comprises an interface unit executed by the at least one processor, said interface unit configured to receive the training dataset from at least one of: a client computing device and a chatbot platform.

13. The system as claimed in claim 11, wherein the error detection engine comprises a data analysis unit executed by the at least one processor, said data analysis unit configured to identify and remove duplicate utterances associated with each of the one or more utterances-intent pairs of the training dataset to obtain a corrected training dataset.

14. The system as claimed in claim 13, wherein the plurality of machine learning models are natural language processing machine learning models, wherein further the plurality of machine learning models are trained with the corrected training dataset using one or more machine learning techniques, and varying tunable parameters associated with the one or more machine learning techniques.

15. The system as claimed in claim 13, wherein the data analysis unit is configured to identify data-imbalances in the corrected training dataset based on mapping of a difference between a highest count of utterances to intent and a lowest count of utterances to intent in the corrected training dataset with a predefined threshold value (T), wherein the corrected training dataset comprises more than one utterances-intent pairs.

16. The system as claimed in claim 15, wherein the set of improvement recommendations associated with each utterances-intent pair of the training dataset is generated based on the evaluated probability of error, the identified duplicate utterances, the identified data imbalances, and an identification of spelling errors associated with the corrected training dataset.

17. The system as claimed in claim 11, wherein the analysis of the respective intent predictions for each utterance received from the diverse set of trained ML models is performed in relation to each other and the intent associated with said utterance in the training dataset.

18. The system as claimed in claim 11, wherein the error detection engine comprises a post processing unit executed by the processor, said post processing unit configured to evaluate the probability of error associated with each utterances-intent pair of the training dataset based on the analysis of the respective intent predictions by:
  receiving the respective intent predictions for each utterance of the utterances-intent pair from each of the diverse set of trained ML models;
  computing the similarity score (S) and performing the mapping; and
  evaluating the probability of error associated with each utterances-intent pair of the training dataset based on the similarity score (S) and the mapping.

19. The system as claimed in claim 11, wherein a type of error including incorrect tagging of utterance to an intent error and closely related intents error is identified based on the similarity score.

20. The system as claimed in claim 19, wherein the set of improvement recommendations comprises at least type of error, number of errors, probability of errors, and suggestions to remove the errors.

21. A computer program product comprising:
a non-transitory computer-readable medium having computer-readable program code stored thereon, the computer-readable program code comprising instructions that, when executed by a processor, cause the processor to:
train a plurality of machine learning models with a training dataset to obtain a diverse set of trained Machine Learning (ML) models, wherein the training dataset comprises one or more utterances-intent pairs;
feed each utterance of the one or more utterances-intent pairs as an input to the diverse set of trained ML models to obtain respective intent predictions for each utterance;
evaluate a probability of error associated with each utterances-intent pair of the training dataset based on an analysis of the respective intent predictions for each utterance, wherein a mismatch during mapping of the intent prediction for each utterance from each of the diverse set of ML models with the intent associated with said utterance in the training dataset and a similarity score (S) associated with the intent predictions for each utterance less than or equal to a predefined similarity-threshold (ST) is indicative of a high probability of error, the similarity score (S) is representative of percentage of ML models out of the diverse set of ML models providing similar intent predictions for same utterance, a mismatch during the mapping and the similarity score (S) greater than or equal to the predefined similarity-threshold (ST) is indicative of a high probability of error, a match during the mapping and the similarity score (S) less than or equal to the predefined similarity-threshold (ST) is indicative of a high probability of error, and a match during the mapping and the similarity score (S) greater than or equal to the predefined similarity-threshold (ST) is indicative of a low probability of error; and
generate a set of improvement recommendations associated with each utterances-intent pair of the training dataset based on at least the evaluated probability of error.

* * * * *